(12) United States Patent
Bade et al.

(10) Patent No.: US 6,572,271 B2
(45) Date of Patent: Jun. 3, 2003

(54) ELASTIC BEARING SUSPENSION FOR A SHAFT BEARING

(75) Inventors: Karl-Heinz Bade, Waldmichelbach (DE); Michael Schütz, Schliengen (DE); Alexander Meier, Kandern (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/964,835

(22) Filed: Sep. 26, 2001

(65) Prior Publication Data

US 2002/0037124 A1 Mar. 28, 2002

(30) Foreign Application Priority Data

Sep. 27, 2000 (DE) .......................................... 100 48 998

(51) Int. Cl.[7] .............................................. F16C 27/06
(52) U.S. Cl. ..................................................... 384/536
(58) Field of Search ................................. 384/535, 536, 384/581, 582; 180/381

(56) References Cited

U.S. PATENT DOCUMENTS

| | | | | |
|---|---|---|---|---|
| 2,933,354 A | * | 4/1960 | Primeau | 384/536 |
| 3,047,345 A | * | 7/1962 | Burton | 384/536 |
| 3,639,015 A | * | 2/1972 | Maas | 384/536 |
| 3,961,829 A | * | 6/1976 | Bowen et al. | 384/536 |
| 4,722,618 A | * | 2/1988 | Matsumoto et al. | 384/536 |
| 5,501,531 A | * | 3/1996 | Hamaekers | 384/581 |

FOREIGN PATENT DOCUMENTS

| | | | |
|---|---|---|---|
| DE | 19 86 857 | 3/1968 | |
| JP | 4073420 A | * 3/1992 | 384/582 |

* cited by examiner

*Primary Examiner*—Thomas R. Hannon
(74) *Attorney, Agent, or Firm*—Kenyon & Kenyon

(57) ABSTRACT

An elastic bearing suspension for a shaft bearing (1) is described. The shaft bearing (1) is connected on the outside radially to at least one stop buffer (2) made of an elastomer material, the stop buffer (2) being connected to a first supporting ring (5) arranged adjacent to and at an axial distance (4) from the shaft bearing (1) by way of at least one fold (3) made of an elastomer material which extends in the axial direction and has a V-shape as seen in the longitudinal sectional of the shaft bearing (1), the first supporting ring (5) being connected to one of the end faces (6) of a stop sleeve (7), the other end face (8) of the stop sleeve (7) surrounding the stop buffer (2) on the outer circumference at a radial distance.

19 Claims, 3 Drawing Sheets

A - A

A − A

ELASTIC BEARING SUSPENSION FOR A SHAFT BEARING

BACKGROUND OF THE INVENTION

1. Field of the Invention

The present invention relates to an elastic bearing suspension for a shaft bearing.

2. Description of Related Art

Such a bearing suspension is known from German Utility Model 19 86 857. The bearing suspension known previously has two supporting rings, the first supporting ring surrounding the second supporting ring on the outer circumference at a distance radially. The first and second supporting rings are arranged in an imaginary radial plane and are connected by a V-shaped fold of elastomer material extending radially. The V-shaped fold is arranged outside the space bordered by the supporting rings, the second supporting ring having a coating of an elastomer material on the inside radially on the side facing the rolling bearing.

However, it should be pointed out that due to the geometry of the fold, the relative mobility of the two supporting rings axially relative to one another is not sufficient for many cases.

SUMMARY OF THE INVENTION

It is an object of the invention to improve upon the bearing suspension of the type defined above such that the shaft bearing can be deflected further in both radial and axial directions without resulting in a mechanical overload on the fold and thus an unwanted reduction in the service life.

This and other objects of the invention are achieved by an elastic bearing suspension for a shaft bearing (1), the shaft bearing (1) being connected on the outside radially to at least one stop buffer (2) made of an elastomer material, the stop buffer (2) being connected to a first supporting ring (5) arranged adjacent to and at an axial distance (4) from the shaft bearing (1) by way of at least one fold (3) made of an elastomer material which extends in the axial direction and has a V-shape as seen in the longitudinal sectional of the shaft bearing (1), the first supporting ring (5) being connected to one of the end faces (6) of a stop sleeve (7), the other end face (8) of the stop sleeve (7) surrounding the stop buffer (2) on the outer circumference at a radial distance.

BRIEF DESCRIPTION OF THE DRAWINGS

The present invention will be described in greater detail with reference to the following drawings wherein.

DETAILED DESCRIPTION OF THE INVENTION

Figure 1:
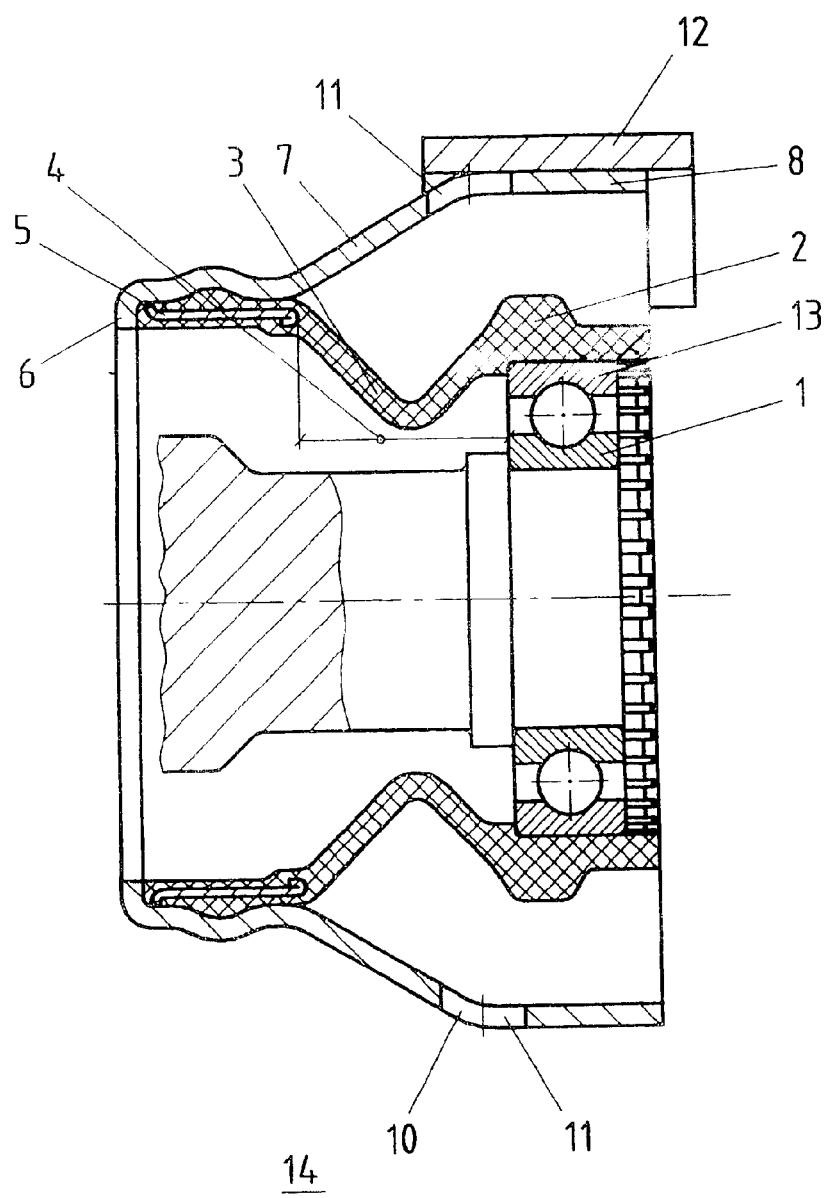
FIG. 1 is a longitudinal section through a first embodiment in which the stop buffer is connected directly to the outside ring of a shaft bearing.

The invention is an elastic bearing suspension for a shaft bearing, the shaft bearing being connected on the outside radially to at least one stop buffer made of an elastomer material, the stop buffer being connected to a first supporting ring arranged adjacent to and at an axial distance from the shaft bearing by way of at least one fold made of an elastomer material which extends in the axial direction and has a V-shape as seen in the longitudinal section of the shaft bearing, the first supporting ring being connected to one of the end faces of a stop sleeve, the other end face of the stop sleeve surrounding the stop buffer on the outer circumference at a radial distance. Due to the fold extending axially, it is advantageous that especially large axial deflections of the shaft bearing relative to the bearing suspension are possible without undesirably great stress on the elastomer material of which the fold is made. In addition, due to the great deflectability of the fold, it is advantageous that shaft bearings having different diameters can be combined with stop sleeves adapted to the respective given facts of the application case. Thus, for example, it is possible to combine shaft bearings having a comparatively small outside diameter with stop sleeves whose stop faces are arranged at a comparatively great radial distance from the stop buffers.

The shaft bearing may be a cardan shaft bearing or an intermediate shaft bearing, for example. If the shaft bearing is used, for example, as a cardan shaft bearing, there may be temperature-induced axial displacements of the cardan shaft and of the shaft bearing surrounding the cardan shaft which are absorbed by the V-shaped fold.

To avoid unwanted noise generation in the event of extreme radial deflections, the stop buffer is provided, bordering the inside periphery of the stop sleeve, preferably having a progressive damping characteristic.

Due to the fold extending axially, service life-reducing compression of the elastomer material of which the fold is made is prevented, even in the case of extreme radial deflection of the shaft bearing relative to the stop sleeve.

From the standpoint of manufacturing the bearing suspension simply and inexpensively, the stop buffer and the fold may be designed in one piece and made of the same material.

According to a first embodiment, the stop buffer may come in direct contact with the shaft bearing. The stop buffer may be vulcanized directly onto the outer ring of a rolling bearing, for example. It is advantageous here that on the whole the bearing suspension is designed with only a few parts.

According to a second embodiment, the shaft bearing may be surrounded on the outside radially by a second supporting ring in a friction-locked and/or form-fitting manner, and the stop buffer may come in direct contact with the second supporting ring. It is advantageous here that the shaft bearing can be replaced separately, if needed. If the shaft bearing is damaged and/or worn, it is forced out of the second supporting ring and replaced by a new shaft bearing which is forced into the second supporting ring.

The first supporting ring and/or second supporting ring may be completely surrounded by an elastomer material. The sheathing of the first and/or second protective ring is then preferably made of the same elastomer material as the stop buffer and the V-shaped fold. Another advantage is that the two supporting rings are reliably protected from corrosion due to being completely sheathed in the elastomer material. In particular, when the shaft bearing is a cardan shaft bearing arranged beneath the underbody of a motor vehicle, such a design is of particular advantage because the cardan shaft bearing is exposed to environmental influences which can reduce its service life, such as dirty splashing water.

In addition, with such a design it is also advantageous that manufacturing tolerances in the interconnected components are compensated by the elastomer coating. This bearing suspension can be manufactured inexpensively due to the generous tolerances allowed for the components.

Either the shaft bearing, the stop buffer, the fold and the first supporting ring, or the second supporting ring, the stop buffer, the fold and the first supporting ring may form a preassembled unit. Handling of such preassembled units is especially simple, minimizing the risk of assembly errors.

The stop buffer may be designed as a self-contained flange around the circumference. It is advantageous here that there is an approximately uniform stress on the material of the stop buffer, regardless of where the stop buffer comes in contact with the inside peripheral surface of the stop sleeve.

One possibility according to another embodiment is that three stop buffers are arranged in uniform distribution around the circumference of the shaft bearing. It is advantageous here that the mass of the bearing suspension, based on a flange-shaped, self-contained stop buffer, is slightly reduced, thus also reducing out-of-balance forces during normal use, especially in the case of small, lightweight shaft bearings.

The stop sleeve may be made of a deep-drawing metallic material. Deep-drawing parts can be manufactured easily and inexpensively, the stop sleeve preferably being provided with an anti-corrosion layer, such as enameling, especially if the shaft bearing is used as a cardan shaft bearing in a motor vehicle.

The first supporting ring and the stop sleeve may be joined together in a friction-locked and/or form-fitting manner. The form fit may be accomplished, for example, by the fact that the stop sleeve has at least one recess extending around the circumference on the side facing the first supporting ring, the recess being filled completely with the elastomer material of the sheathing of the first supporting ring. Since the elastomer material engages in the recess in a form-fitting manner, this produces a form-fitting connection in this area, the first supporting ring being held additionally by friction locking inside the stop sleeve in the axially adjacent partial areas.

The stop sleeve may have at least one drain hole at least at its lowest point in the installed ready-to-use state. According to an even more advantageous embodiment, six drain holes may be distributed uniformly around the circumference. The drain holes are provided so that splash water entering the gap formed by the radial distance between the stop sleeve and the stop buffer during normal use of the bearing suspension can be drained off back into the environment.

With regard to the weight of the bearing suspension, it is advantageous if the supporting rings are made of a lightweight metal such as aluminum. The rings are advantageously embedded in an elastomer material, thus suppressing contact corrosion with the stop sleeve. These reinforcing rings need not be coated since they are embedded in the polymer material.

Figure 2:
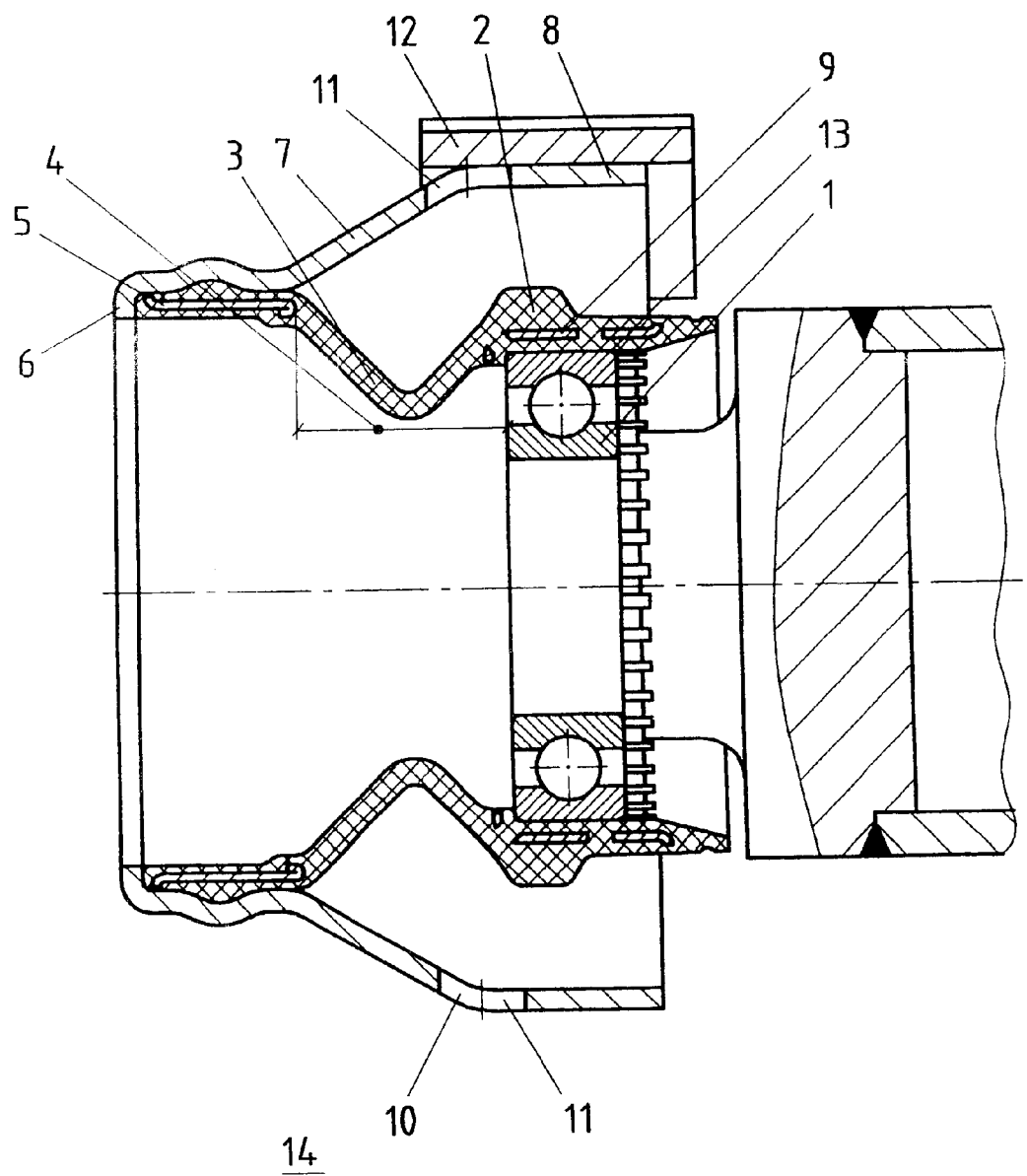
FIG. 2 is a second embodiment in which the stop buffer is connected to a second supporting ring, the shaft bearing being pressed into the second supporting ring.

FIGS. 1 and 2 show two embodiments of an elastic bearing suspension for a shaft bearing 1. In these embodiments, shaft bearing 1 is formed by a rolling bearing and is used as a cardan shaft bearing in rear-wheel drive vehicles or four-wheel drive vehicles. The advantage of the bearing suspension shown here is the great axial displacement that can be executed by shaft bearing 1 relative to first supporting ring 5 or stop sleeve 7. In the embodiments shown here, stop buffer 2 is designed as a flange and is self-contained around the circumference. Fold 3 extending in the axial direction has a V-shape as seen in the longitudinal section of shaft bearing 1 and, like stop buffer 2, it is made of an elastomer material to compensate for axial movements of the supported shaft relative to stop sleeve 7 which has a stationary connection to a bearing block 12. V-shaped fold 3 connects stop buffer 2 to first supporting ring 5 which is arranged adjacent to and at an axial distance from shaft bearing 1. First end face 6 of stop sleeve 7 surrounds first supporting ring 5 on the outer circumference with a radial prestress, so that stop sleeve 7 has an essentially funnel-shaped enlargement in the direction of its other end face 8 and surrounds stop buffer 2 at a radial distance. Stop buffer 2 is arranged at a distance from the inside periphery of the stop sleeve due to a gap. Stop sleeve 7 protects the interior components from the effects of heat from the exhaust system.

FIG. 1 shows a first embodiment in which stop buffer 2 is vulcanized directly onto outside ring 13 of shaft bearing 1.

FIG. 2, however, shows a second embodiment in which shaft bearing 1 is arranged in a second supporting ring 9 surrounding shaft bearing 1 on the outside radially. In the embodiment shown here, first supporting ring 5 and second supporting ring 9 are both completely enclosed by an elastomer material and are thus protected from harmful environmental effects and corrosion.

Stop sleeve 7 is provided with six drain holes 11 distributed uniformly around the circumference so that impurities and/or moisture penetrating into the gap formed by the radial distance between stop buffer 2 and the inside periphery of stop sleeve 7 can be drained back out to environment 14.

In each embodiment, stop sleeve 7 is made of a deep-drawn metallic material and is flanged on the inside radially in the area of its first end face 6 to accommodate first supporting ring 5.

Stop sleeve 7 and bearing block 12 are connected by welding the two parts together, for example.

Figure 3:
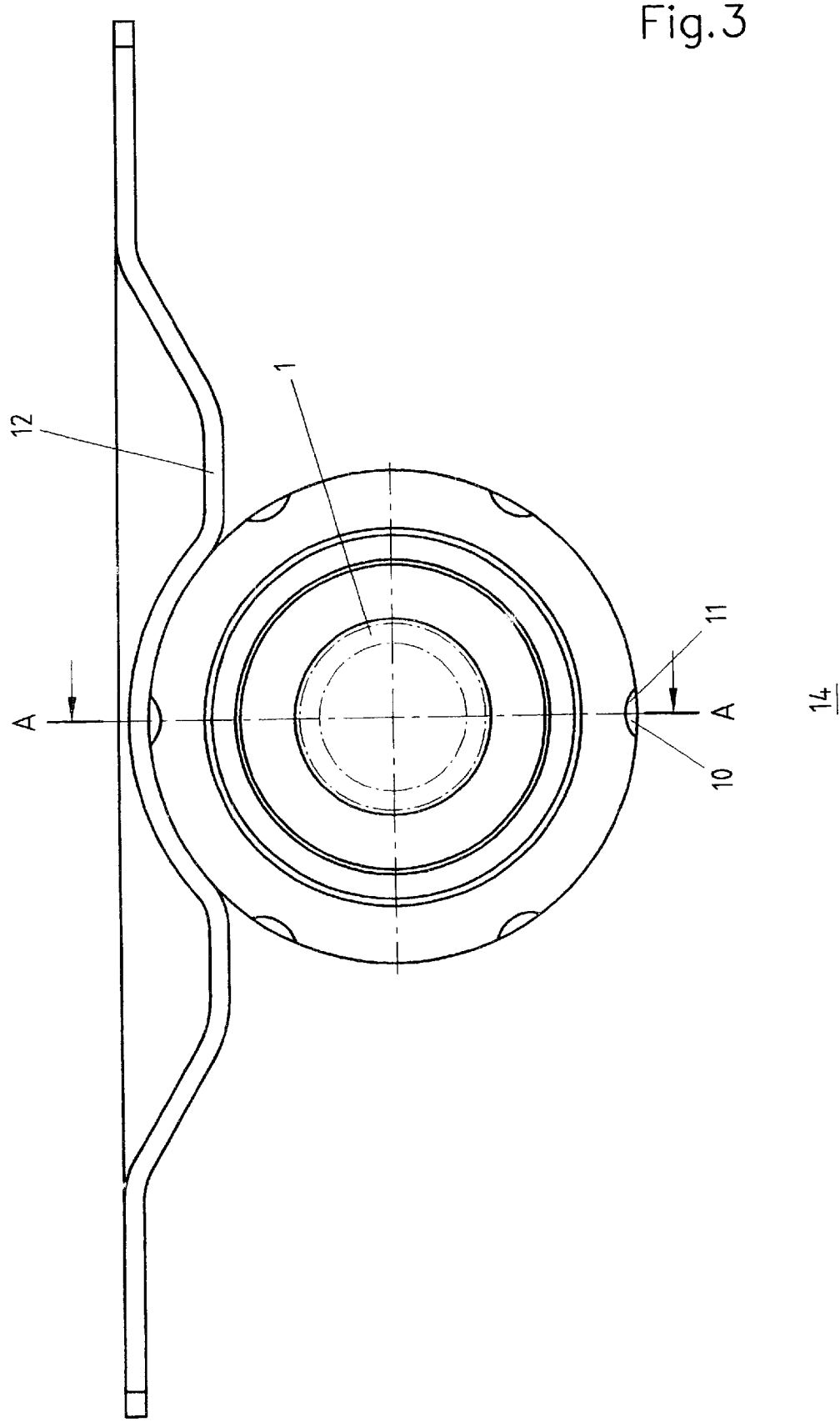
FIG. 3 is a side view of the embodiment from FIG. 1 as seen from the right.

FIG. 3 shows a view of the bearing suspension from FIG. 2 as seen from the right. Bearing block 12 is mounted on the underside of a vehicle with rear-wheel drive, for example. One of drain holes 11 is arranged at lowest point 10 on the stop sleeve, drain holes 11 being distributed uniformly around the entire circumference.

What is claimed is:

1. An elastic bearing suspension for a shaft bearing (1), the shaft bearing (1) being connected on the outside radially to at least one stop buffer (2) made of an elastomer material, the stop buffer (2) being connected to a first supporting ring (5) arranged adjacent to and at an axial distance (4) from the shaft bearing (1) by way of at least one fold (3) made of an elastomer material which extends in the axial direction and has a V-shape as seen in the longitudinal sectional of the shaft bearing (1), the first supporting ring (5) being connected to one of the end faces (6) of a stop sleeve (7), the other end face (8) of the stop sleeve (7) surrounding the stop buffer (2) on the outer circumference at a radial distance.

2. The bearing suspension according to claim 1, wherein the stop buffer (2) and the fold (3) are designed in one piece and made of the same material.

3. The bearing suspension according to claim 1, wherein the stop buffer (2) comes in direct contact with the shaft bearing (1).

4. The bearing suspension according to claim 1, wherein the shaft bearing (1) is surrounded on the outside radially by a second supporting ring (9) in a friction-locked or form-fitting manner, and the stop buffer (2) comes in direct contact with the second supporting ring (9).

5. The bearing suspension according to claim 4, wherein the first supporting ring (5) or the second supporting ring (9)

is made of a lightweight metal, and is embedded in an elastomer material.

6. The bearing suspension according to claim 5, wherein the metal is aluminum.

7. The bearing suspension according to claim 1, further comprising:
   a second supporting ring (9); wherein the first supporting ring (5) or the second supporting ring (9) is completely surrounded by an elastomer material.

8. The bearing suspension according to claim 1, further comprising:
   a second supporting ring (9); wherein the shaft bearing (1), the stop buffer (2), the fold (3) and the first supporting ring (5), or the second supporting ring (9), the stop buffer (2), the fold (3) and the first supporting ring (5) form a preassembled unit.

9. The bearing suspension according to claim 1, wherein the stop buffer (2) is designed as a self-contained flange around the circumference.

10. The bearing suspension according to claim 1, wherein three stop buffers (2) are arranged in uniform distribution around the circumference of the shaft bearing (1).

11. The bearing suspension according to claim 1, wherein the stop sleeve (7) is made of a deep-drawn metallic material.

12. The bearing suspension according to claim 1, wherein the first supporting ring (5) and the stop sleeve (7) are joined together in a friction-locked or form-fitting manner.

13. The bearing suspension according to claim 1, wherein the stop sleeve (7) has at least one drain hole (11) at least at its lowest point (10) in an installed ready-to-use state.

14. The bearing suspension according to claim 13, wherein six drain holes (11) are distributed uniformly around the circumference.

15. The bearing suspension according to claim 1, wherein the stop buffer contacts the shaft bearing.

16. The bearing suspension according to claim 1, further comprising:
   a second supporting ring surrounding the shaft bearing on the outside radially in one of a friction-locked and a form-fitting manner, the stop buffer contacting the second supporting ring.

17. The bearing suspension according to claim 1, further comprising:
   a second supporting ring, wherein at least one of the first supporting ring and the second supporting ring is completely surrounded by an elastomer material.

18. An elastic bearing suspension for a shaft bearing, comprising:
   at least one stop buffer made of an elastomer material and radially connected on an outside of the shaft bearing;
   a first supporting ring arranged adjacent to and at an axial distance from the shaft bearing, the stop buffer being connected to the first supporting ring by a at least one fold made of an elastomer material, the fold extending axially and having a V-shape as seen perpendicular to a longitudinal section of the shaft bearing; and
   a stop sleeve having a plurality of end faces, wherein the first supporting ring is connected to a first end face of the plurality of end faces, and a second end face of the plurality of end faces surrounds the stop buffer on an outer circumference at a radial distance.

19. The bearing suspension according to claim 18, wherein the stop buffer and the fold form a single piece made of a same material.

* * * * *